(12) United States Patent
Rothman et al.

(10) Patent No.: US 9,286,097 B2
(45) Date of Patent: Mar. 15, 2016

(54) SWITCHING A FIRST OS IN A FOREGROUND TO A STANDBY STATE IN RESPONSE TO A SYSTEM EVENT AND RESUMING A SECOND OS FROM A BACKGROUND

(71) Applicant: INTEL CORPORATION, Santa Clara, CA (US)

(72) Inventors: Michael A. Rothman, Puyallup, WA (US); Vincent J. Zimmer, Federal Way, WA (US); Ping Wu, Shanghai (CN); Zijan You, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 133 days.

(21) Appl. No.: 14/124,238

(22) PCT Filed: Nov. 7, 2013

(86) PCT No.: PCT/US2013/068985
§ 371 (c)(1),
(2) Date: Dec. 5, 2013

(87) PCT Pub. No.: WO2015/012878
PCT Pub. Date: Jan. 29, 2015

(65) Prior Publication Data
US 2015/0033225 A1      Jan. 29, 2015

Related U.S. Application Data

(60) Provisional application No. 61/863,271, filed on Aug. 7, 2013, provisional application No. 61/857,376, filed on Jul. 23, 2013.

(51) Int. Cl.
*G06F 9/455* (2006.01)
*G06F 9/46* (2006.01)

(52) U.S. Cl.
CPC ........ *G06F 9/45533* (2013.01); *G06F 9/45558* (2013.01); *G06F 9/461* (2013.01)

(58) Field of Classification Search
None
See application file for complete search history.

(56) References Cited

U.S. PATENT DOCUMENTS

| 5,701,508 A * | 12/1997 | Glew et al. ................. 712/23 |
| 2002/0013802 A1* | 1/2002 | Mori et al. ................. 709/1 |
| 2004/0068627 A1 | 4/2004 | Sechrest et al. |
| 2005/0132363 A1* | 6/2005 | Tewari et al. ................. 718/1 |
| 2005/0188361 A1* | 8/2005 | Cai et al. ................. 717/148 |

(Continued)

OTHER PUBLICATIONS

International Search Report and Written Opinion mailed Mar. 28, 2014 for International Application No. PCT/US2013/068985, 17 pages.

*Primary Examiner* — Meng An
*Assistant Examiner* — Jorge A Chu Joy-Davila
(74) *Attorney, Agent, or Firm* — Schwabe, Williamson & Wyatt, P.C.

(57) ABSTRACT

Apparatuses, methods and storage media associated with switching operating systems are disclosed herewith. In embodiments, an apparatus for computing may include one or more processors; and a virtual machine manager to be operated by the one or more processors to instantiate a first virtual machine with a first operating system in a background, and a second virtual machine with a second operating system in a foreground; wherein the virtual machine manager is further to place the first virtual machine, on instantiation, in background into a standby state. Other embodiments may be disclosed or claimed.

15 Claims, 5 Drawing Sheets

(56) References Cited

U.S. PATENT DOCUMENTS

| | | |
|---|---|---|
| 2008/0177994 A1 | 7/2008 | Mayer |
| 2009/0125902 A1* | 5/2009 | Ghosh et al. .................. 718/1 |
| 2009/0167773 A1 | 7/2009 | Wang et al. |
| 2009/0172439 A1* | 7/2009 | Cooper et al. ............. 713/323 |
| 2009/0193245 A1* | 7/2009 | Isaacson ......................... 713/2 |
| 2010/0122077 A1* | 5/2010 | Durham ...................... 713/100 |
| 2011/0126139 A1* | 5/2011 | Jeong et al. ................. 715/767 |
| 2011/0249668 A1 | 10/2011 | Van Milligan et al. |
| 2012/0084481 A1* | 4/2012 | Reeves et al. ............... 710/304 |
| 2013/0024812 A1* | 1/2013 | Reeves et al. ............... 715/810 |

* cited by examiner

Non-transitory computer-readable storage medium
502

Programming Instructions 504
configured to cause a device, in response to execution of the programming instructions, to implement selected elements of Figure 1, and/or practice (aspects of) method of Figure 3.

Figure 5

SWITCHING A FIRST OS IN A FOREGROUND TO A STANDBY STATE IN RESPONSE TO A SYSTEM EVENT AND RESUMING A SECOND OS FROM A BACKGROUND

CROSS REFERENCE TO RELATED APPLICATIONS

The present application is a national phase entry under 35 U.S.C. §371 of International Application No. PCT/US2013/068985, filed Nov. 7, 2013, 2013, entitled "OPERATING SYSTEM SWITCHING METHOD AND APPARATUS", which claims priority to claims priority to U.S. provisional application 61/863,271, filed Aug. 7, 2013, entitled "Operating System Switching Method and Apparatus," and to U.S. provisional application 61/857,376, filed on Jul. 23, 2013, entitled "Operating System Switching Method and Apparatus." PCT/US2013/068985 designated, among the various States, the United States of America. The Specification of the PCT/US2013/068985 Application is hereby incorporated by reference.

TECHNICAL FIELD

The present disclosure relates to the field of computing, in particular, to apparatuses, methods and storage medium associated with switching operating systems.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

The need for a very simple means of switching between two operating systems in a timely manner while a computing device is running has become a requirement that has suddenly come to the forefront of "needs" by various original equipment manufacturers (OEMs) of computing devices.

One way of handling this requirement is through employment of a hibernation state (S4) to switch between two hibernated operating systems. This can take a long time and causes usability issues when there is a desire to quickly change from one context to another.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

FIG. 5 illustrates an example storage medium with instructions configured to enable a computing device to practice the present disclosure, in accordance with various embodiments.

DETAILED DESCRIPTION

Apparatuses, methods and storage media associated with switching operating systems are disclosed herewith. In embodiments, an apparatus for computing may include one or more processors; and a virtual machine manager configured to be operated by the one or more processors to instantiate a first virtual machine with a first operating system in a background, and a second virtual machine with a second operating system in a foreground; wherein the virtual machine manager is further configured to place the first virtual machine, on instantiation, in background into a standby state. Examples of the two operating systems may include, but are not limited to, an operating system configured to support tablet computing, and an operating system configured to support laptop computing.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
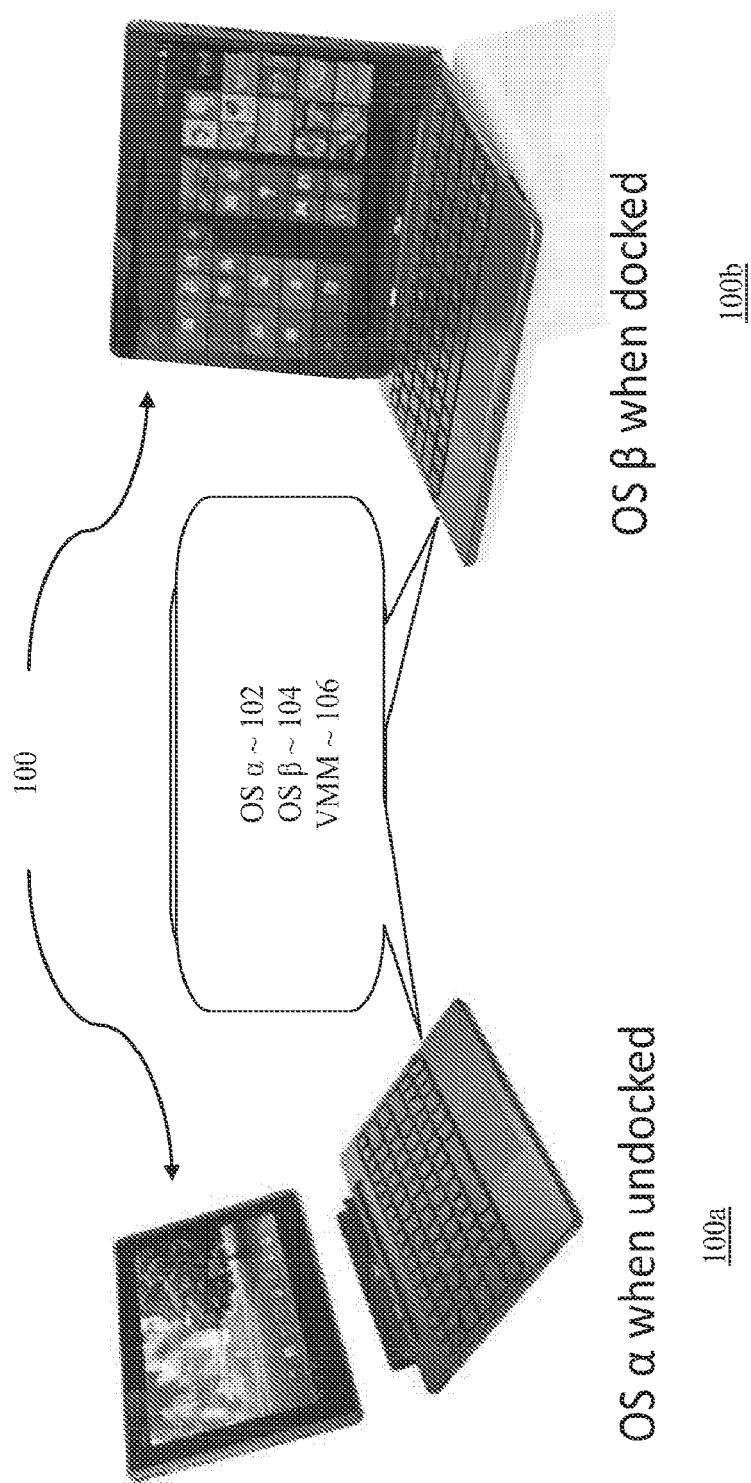
FIG. 1 illustrates a computing device incorporated with the operating system switching teachings of the present disclosure, in accordance with various embodiments.

Referring now to FIG. 1 wherein a computing device incorporated with the operating system (OS) switching teachings of the present disclosure, in accordance with various embodiments, is shown. As illustrated, in embodiments, computing device 100 may be configured to operate in at least two modes, e.g., an undocked mode 100a, or a docked mode 100b. Computing device 100 may be configured with OS α 102 and OS β 104. OS α 102 may be employed while computing device 100 operates in undocked mode 100a, and OS β 104 may be employed when computing device 100 operates in docked mode 100b. Examples of OS α 102 and OS β 104 may respectively include, but are not limited to, operating systems designed for computing tablet and laptop computers, such as Android and Windows®, available correspondingly from Google Inc. of Mountain View, Calif., and Microsoft Corporation of Redmond, Wash. Further examples of OS 102/104 may include, but are not limited Linux, available from a number sources, e.g., Red Hat of Raleigh, N.C., and Mac OS, available from Apple Computer of Cupertino, Calif. Additionally, computing device 100 may include virtual machine manager (VMM) 106, incorporated with the OS switching teaching of the present disclosure. VMM 106 may also be referred to as a hypervisor. For the present application, the two terms may be considered as synonymous.

Before further describing computing device 100 and its components, it should be noted that while for ease of understanding, the present disclosure will be described in terms of OS switching in response to a docking or undocking event, the present disclosure is not so limited. It is anticipated that the OS switching teaching of the present disclosure may be practiced in response to other events and/or under other contexts. Examples of other events may include, but are not limited to user pressing a button of computing device 100, user providing instruction through voice command, computing device 100 recognizing a different user (through camera, finger print et al), and so forth.

Figure 2:
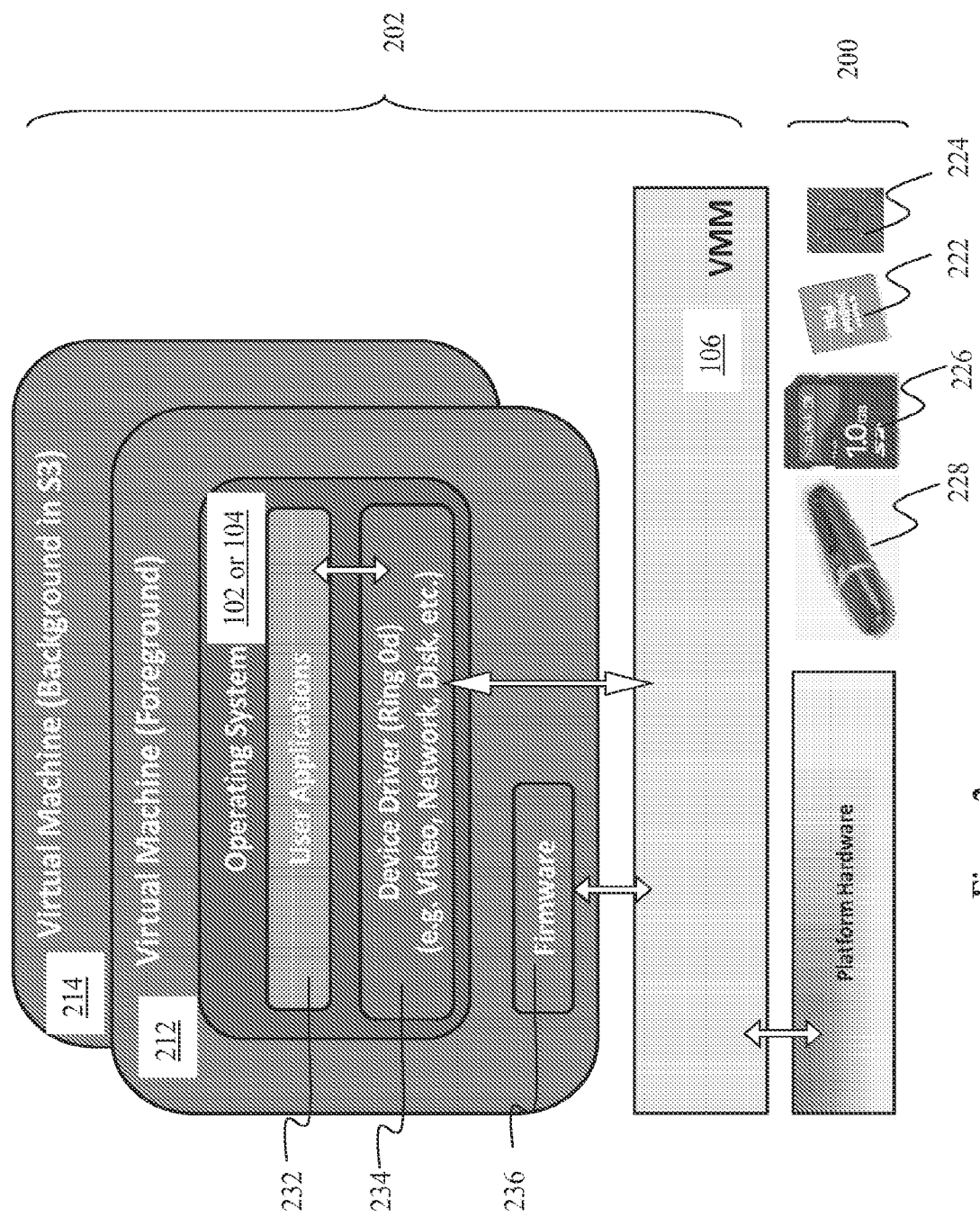
FIG. 2 illustrates a software view of the computing device of FIG. 1, in accordance with various embodiments.

FIG. 2 illustrates a software view of the computing device of FIG. 1, in accordance with various embodiments. As shown, platform hardware 200 of computing device 100 may include a plurality of hardware elements including, but are not limited to, microprocessors 222, chipsets 224, solid-state storage medium 226, input/output devices 228, and so forth. One or more of the microprocessors 222 may be multi-core. Chipsets 224 may include, but is not limited, memory controller, and so forth. Solid-state storage medium 226 may include, but is not limited to, storage devices that employ Rapid Storage Technology (RST), available from Intel Corporation of Santa Clara, Calif. Input/output devices 228 may include, but are not limited to, keyboard, cursor control device, touch screen, wired and/or wireless communication interfaces. Software elements 202 may include earlier described VMM 106, OS α 102, and OS β 104, as well as a wide range of applications known in the art. VMM 106 may be configured to be operated directly on the hardware. For example, in embodiments, VMM 106 may be the first third party driver running from firmware, in particular, firmware configured with Unified Extensible Firmware Interface (UEFI).

As shown, VMM 106 may be configured to respectively operate the two OS 102 and 104 in two separate virtual machines (VM) 212 and 214. In embodiments, one of two VMs 212 and 214 may be operated in the foreground, while the other may be operated in the background. Further, the VM in the foreground 212 may be given full priority, while the VM in the background 214 may be given no priority. In embodiments, the VM in the background 214 may be placed in a standby state (S3). Further, each VM 212 or 214, in addition to OS 102 or 104, may have its own firmware 236. Each OS 102 or 104 may control operation of its own user applications 232, device drivers 234 and so forth.

Figure 3:
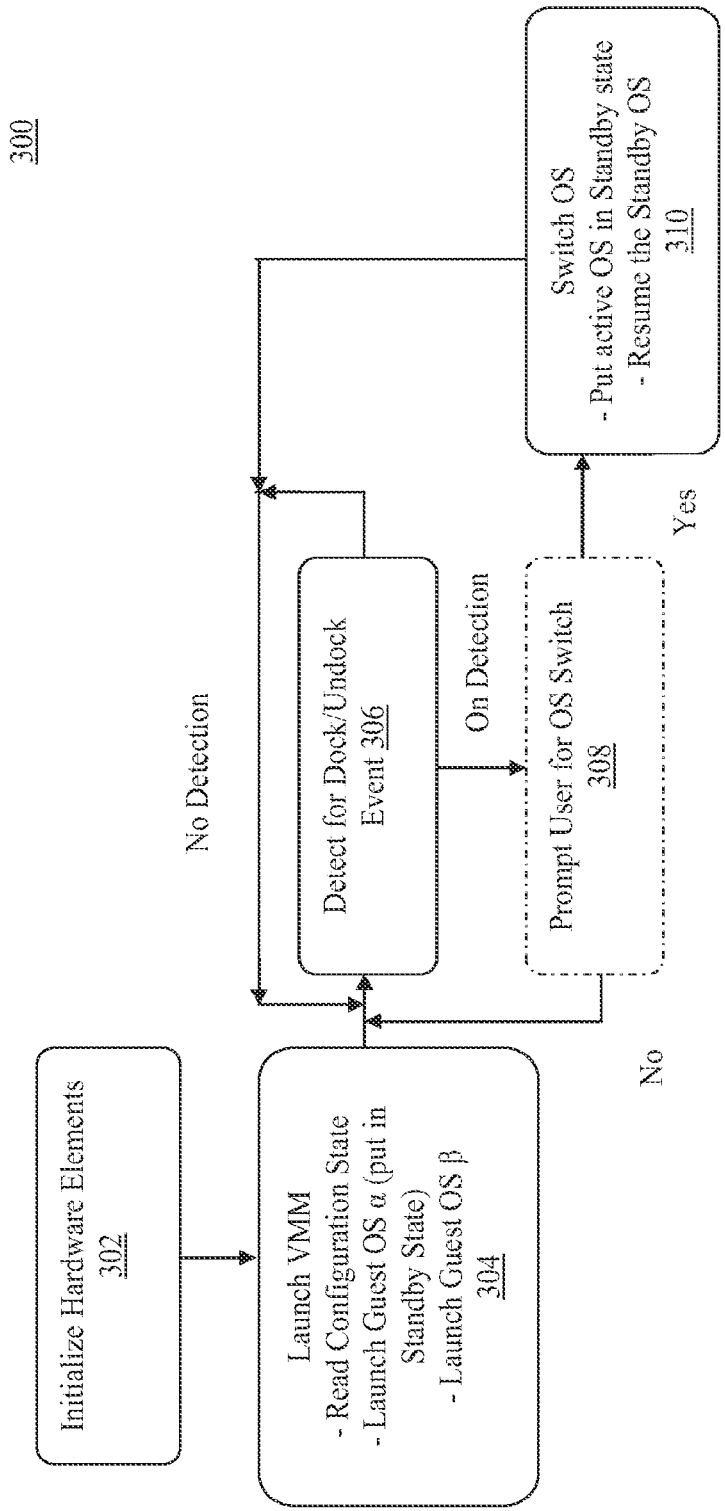
FIG. 3 illustrates a method for switching operating system, in accordance with various embodiments.

FIG. 3 illustrates a method for switching operating system, in accordance with various embodiments. As shown, method 300 for switching OS may include operations in block 302 through 310. The operations may, e.g., be performed by the earlier described VMM 106.

In embodiments, method 300 may start at block 302. At block 302, at power on, reset, or other system events, the hardware elements of the computing device may be initialized. From block 302, method 300 may proceed to block 304. At 304, the VMM may be launched. As part of the launching process, VMM may read the configuration state of each VM. Further, the VMM may launch one of the OS, e.g., OS α, in a background VM, and another one of the OS, e.g. OS β, in a foreground VM. However, on launching the background VM (before or after launching the foreground VM), the VMM may further place the background VM (and therefore OS α) into a standby state.

From block 304, method 300 may proceed to block 306. At block 306, the VMM may monitor for a docking or undocking event. On detection of a docking/undocking event, method 300 may optionally proceed to block 308. At block 308, the VMM may prompt the user to confirm whether the user desires having the OS switched. From block 306 or 308, method 300 may proceed to block 310. At block 310, the VMM may switch the OS. The VMM may put the current foreground VM (and therefore its OS) into the standby state, and move the VM into background. Thereafter, the VMM may transfer execution control to resumption of the previous standby background VM (therefore its OS), and moving the previous standby background VM, now resumed or in the process of being resumed, into the foreground.

While in standby state, the background VM (and therefore its OS) receives no priority, and no interrupts. The foreground VM (and therefore its OS) gets the full priority and receives all the interrupts. As a result, under method 300, no timers or other mechanisms need to be employed to pass interrupts to the background VM/OS. Concurrency and/or hardware resource sharing issues may be avoided. Thus, overall, the overhead of switching the OS, in accordance with embodiments of the present disclosure, may be relatively low, and may be accomplished efficiently.

In embodiments, at block 310, when switching from one OS to the other OS, the platform may go through a restart. The restart may include resetting the microprocessors and the chipsets. Further, switching from one OS to the other OS may also include saving the context of the "switching from" OS, and restoring the "switching to" OS.

In embodiments, the restart may begin on detection of the "switching from" OS generating a sleep event, e.g., through assertion of a SLP_EN (sleep enable) operation. Further, the restart may be effectuated through a highly abbreviated sleep cycle (S3) from within the platform's firmware. The highly abbreviated sleep cycle may be accomplished, e.g., by setting a resume destination in the platform firmware itself, circumventing, e.g., up to 85% of conventional initialization time. For example, the sleep event generated by the "switching from" OS may be detected by the RST driver. On detection, the RST driver may save the context of the "switching from" OS in memory, into a persistent storage. Further the RST driver may program a sleep state register of the platform with information that denotes the platform hardware is to enter the sleep state, and a resume vector pointing to the RST driver to resume the platform. Thus, on entry into the sleep state, the platform may transfer control back to the RST right away, which in turn may resume the platform right away. Such highly abbreviated restart may potentially reduce the restart time to approximately 250 ms, as compared to conventional restart that takes 2 or more seconds.

In embodiments, the saving and restoring of the contexts of the "switching from" and "switch to" OS may also be streamlined by saving and restoring an amount of memory that is substantially corresponding to only the smaller of the two OS.

For example, if OS1 is Windows®, and OS2 is Android, their respective memory requirements may be 4 GB and 512 MB. Instead of saving and restoring all 4 GB when Windows® is switched out and switched in, embodiments of the present disclosure may save only about 512 MB of Windows® (the portion of memory to be made available to restore Android) when switching out Windows®, and likewise, restore only the saved 512 MB of Windows® when switching Windows® back in, even though the entire context is 4 GB. As result, save and restore may be significantly streamlined.

In embodiments, method 300 may be performed without the optional prompting operation of block 308. In embodiments, method 300 may be practiced in giving the user the option to be prompted or not, or in the alternative, always switch the OS without prompting the user.

Figure 4:
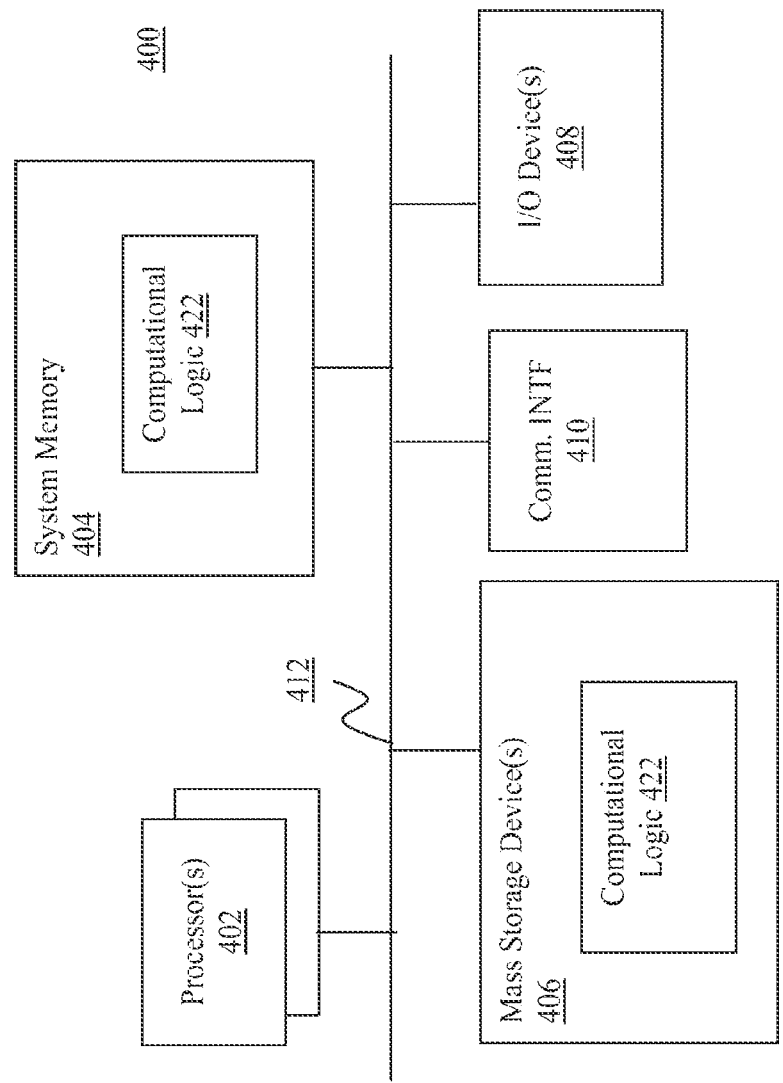
FIG. 4 illustrates a component view of an example computer system suitable for practicing the disclosure, in accordance with various embodiments.

Referring now to FIG. 4, wherein an example computer suitable for use for the arrangement of FIG. 1, in accordance with various embodiments, is illustrated. As shown, computer 400 may include one or more processors or processor cores 402, and system memory 404. In embodiments, multiples processor cores 402 may be disposed on one die. For the purpose of this application, including the claims, the terms "processor" and "processor cores" may be considered synonymous, unless the context clearly requires otherwise. Additionally, computer 400 may include mass storage device(s) 406 (such as diskette, hard drive, compact disc read only memory (CD-ROM) and so forth), input/output device(s) 408 (such as display, keyboard, cursor control and so forth) and communication interfaces 410 (such as network interface cards, modems and so forth). In embodiments, a display unit may be touch screen sensitive and includes a display screen, one or more processors, storage medium, and communication elements, further it may be removably docked or undocked from a base platform having the keyboard. The elements may be coupled to each other via system bus 412, which may represent one or more buses. In the case of multiple buses, they may be bridged by one or more bus bridges (not shown).

Each of these elements may perform its conventional functions known in the art. In particular, system memory 404 and mass storage device(s) 406 may be employed to store a working copy and a permanent copy of the programming instructions implementing the operations described earlier, e.g., but not limited to, operations associated with VMM 106, denoted as computational logic 422. The various elements may be implemented by assembler instructions supported by processor(s) 402 or high-level languages, such as, for example, C, that can be compiled into such instructions.

The permanent copy of the programming instructions may be placed into permanent mass storage device(s) 406 in the factory, or in the field, through, for example, a distribution medium (not shown), such as a compact disc (CD), or through communication interface 410 (from a distribution server (not shown)). That is, one or more distribution media having an implementation of the agent program may be employed to distribute the agent and program various computing devices.

The number, capability and/or capacity of these elements 410-412 may vary, depending on the intended use of example computer 400, e.g., whether example computer 400 is a smartphone, tablet, ultrabook or laptop. The constitutions of these elements 410-412 are otherwise known, and accordingly will not be further described.

FIG. 5 illustrates an example non-transitory computer-readable storage medium having instructions configured to practice all or selected ones of the operations associated with VMM 106, earlier described, in accordance with various embodiments. As illustrated, non-transitory computer-readable storage medium 502 may include a number of programming instructions 504. Programming instructions 504 may be configured to enable a device, e.g., computer 400, in response to execution of the programming instructions, to perform, e.g., various operations of method 300 of FIG. 3 respectively. In alternate embodiments, programming instructions 504 may be disposed on multiple non-transitory computer-readable storage medium 502 instead. In still other embodiments, programming instructions 504 may be encoded in transitory computer readable signals.

Referring back to FIG. 4, for one embodiment, at least one of processors 402 may be packaged together with computational logic 422 (in lieu of storing in system memory 404 and/or mass storage device 406) configured to practice aspects of the method of FIG. 3. For one embodiment, at least one of processors 402 may be packaged together with computational logic 422 configured to practice aspects of the method of FIG. 3 to form a System in Package (SiP). For one embodiment, at least one of processors 402 may be integrated on the same die with computational logic 422 configured to practice aspects of the method of FIG. 3. For one embodiment, at least one of processors 402 may be packaged together with computational logic 422 configured to practice aspects of the method of FIG. 3 to form a System on Chip (SoC). For at least one embodiment, the SoC may be utilized in, e.g., but not limited to, a computing tablet.

Accordingly, example non-limiting embodiments described may include:

Example one may be an apparatus for computing. The apparatus may include one or more processors, and a virtual machine manager. The virtual machine manage may be configured to be operated by the one or more processors to instantiate, at e.g., power on, reset or other system events, a first virtual machine with a first operating system in a background, and a second virtual machine with a second operating system in a foreground. Additionally, the virtual machine manager may be further configured to place the first virtual machine, on instantiation, in background into a standby state.

Example two may be example one, wherein the first virtual machine in background may receive no priority or interrupt, and/or the second virtual machine in foreground to receive full priority and all interrupts.

Example three may be example one or two, wherein the virtual machine manager may be further configured to place the second virtual machine into a standby mode, and move the second virtual machine, in standby mode, to background, in response to a system event, and additionally, bring the first virtual machine out of standby and resume in foreground.

Example four may be example three, wherein the system event may include a docking or an undocking event.

Example five may be example four, wherein the system event may include an undocking event, wherein the first operating system may include an operating system configured to support tablet computing, and the second operating system may include an operating system configured to support laptop computing.

Example six may be any one of examples three through five, wherein the virtual machine manager may be further configured to prompt a user of the apparatus to confirm whether the user desires having the OS switched.

Example seven may be any one of examples three through six, further including a driver configured to cause an abbreviated restart of the apparatus, when the second virtual machine may be placed into the standby mode, and moved to background.

Example eight may be example seven, wherein the second virtual machine may be configured to generate a sleep event, and the driver may be configured to detect for the sleep event, and on detection of the sleep event, save a context of the second operating system.

Example nine may be example eight, wherein the driver may be further configured to, on detection of the sleep event, program a sleep state register of the apparatus with information that denotes the apparatus is to enter a sleep state, and a resume vector pointing to the driver to resume the apparatus, to enable the driver to regain control on entry into the sleep state, and resume the apparatus on regaining control.

Example ten may be example eight, wherein the first and second operating systems respectively has a first memory size and a second memory size, and the driver may be further configured to save an amount of memory based at least in part on a memory size of the smaller of the first memory size and the second memory size, when saving the context of the second operating system.

Example 11 may be a method for computing. The method may include instantiating, at e.g., power on, reset or other system events, by a virtual machine manager of a computing device, a first virtual machine with a first operating system in a background, and a second virtual machine with a second operating system in a foreground; and placing, by the virtual machine manager, the first virtual machine in background into a standby state.

Example 12 may be example 11, further including according, by the virtual machine manager, the second virtual machine in foreground with full priority and recipient of all interrupts, and/or with the first virtual machine in background to receive no priority nor interrupt.

Example 13 may be example 11 or 12, further including in response to a system event, placing, by the virtual machine manager, the second virtual machine into a standby mode, and moving the second virtual machine, in standby mode, to background, and additionally, bringing the first virtual machine out of standby and resuming in foreground.

Example 14 may be example 13, wherein the system event includes a docking or an undocking event.

Example 15 may be example 14, wherein the system event includes an undocking event, wherein the first operating system includes an operating system configured to support tablet computing, and the second operating system includes an operating system configured to support laptop computing.

Example 16 may be any one of examples 13 through 15, further including prompting, by the virtual machine manager, a user of the computing device to confirm whether the user desires having the OS switched.

Example 17 may be any one of examples 13 through 16, further including causing, by a driver of the computing device, an abbreviated restart of the computing device, when the second virtual machine is being placed into the standby mode, and moved to background Example 18 may be example 17, wherein the second virtual machine is configured to generate a sleep event, and the method further comprises, detecting, by the driver, for the sleep event, and on detecting the sleep event, saving, by the driver, a context of the second operating system.

Example 19 may be example 18, further including, on detecting the sleep event, programming, by the driver, a sleep state register of the computing device with information that denotes the computing device is to enter a sleep state, and a resume vector pointing to the driver to resume the computing device, to enable the driver to regain control on entry into the sleep state, and resume the computing device on regaining control.

Example 20 may be example 18, wherein the first and second operating systems respectively has a first memory size and a second memory size, and the method further including saving, by the driver, an amount of memory based at least in part on a memory size of the smaller of the first memory size and the second memory size, when saving the context of the second operating system.

Example 21 may be one or more storage media that include a plurality of instructions configured to cause an apparatus, in response to execution of the instructions by the apparatus, to: instantiate, at e.g., power on, reset or system events, a first virtual machine with a first operating system in a background, and a second virtual machine with a second operating system in a foreground; and place the first virtual machine in background into a standby state.

Example 22 may be the storage medium/media of example 21, wherein the apparatus may be further caused to accord he second virtual machine in foreground with full priority and recipient of all interrupts, and/or with the first virtual machine in background to receive no priority nor interrupt.

Example 23 may be example 21 or 22, wherein the apparatus may be further caused to respond to a system event, with placement of the second virtual machine into a standby mode, and movement of the second virtual machine, in standby mode, to background, and additionally, bring the first virtual machine out of standby and resume in foreground.

Example 24 may be example 23, wherein the system event comprises a docking or an undocking event.

Example 25 may be example 24, wherein the system event may include an undocking event, wherein the first operating system may include an operating system configured to support tablet computing, and the second operating system may include an operating system configured to support laptop computing.

Example 26 may be any one of examples 23-25, wherein the apparatus may be further caused to prompt a user of the apparatus to confirm whether the user desires having the OS switched.

Example 27 may be any one of examples 23-26, wherein the apparatus may be further caused to cause an abbreviated restart, when the second virtual machine is being placed into the standby mode, and moved to background.

Example 28 may be example 27, wherein the second virtual machine may be configured to generate a sleep event, and the apparatus may be further caused to detect for the sleep event, and on detecting the sleep event, save a context of the second operating system.

Example 29 may be example 28, wherein the apparatus may be further caused to, on detecting the sleep event, program, with a device driver, a sleep state register of the apparatus with information that denotes the apparatus is to enter a sleep state, and a resume vector to point to the driver to resume the apparatus, to enable the driver to regain control on entry into the sleep state, and resume the apparatus on regaining control.

Example 30 may be example 28, wherein the first and second operating systems respectively has a first memory size and a memory second size, and wherein save a context of the second operating system may include save an amount of memory based at least in part on a memory size of the smaller of the first memory size and the second memory size.

Example 31 may be a system for computing. The system may include base platform means, including virtual machine manager means for instantiating, at e.g., power on, reset or other system event, a first virtual machine with a first operating system in a background for computing, and a second virtual machine with a second operating system in a foreground for computing; including placing the first virtual machine in background into a standby state; and a touch-sensitive display unit including a display screen and the one or more processors, and configured to be removably couple with the base platform means.

Example 32 may be example 31, wherein the virtual machine manager means may be further for placing the second virtual machine into a standby mode, and moving the second virtual machine, in standby mode, to background, in response to a system event, and additionally, bringing the first virtual machine out of standby and resume in foreground.

Example 33 may be example 31 or 32, wherein the base platform means may further include driver means for causing an abbreviated restart, when the second virtual machine may be placed into the standby mode, and moved to background.

Example 34 may be example 33, wherein the abbreviated restart may include saving, by the driver, a context of the second operating system, and wherein the first and second operating systems respectively may have a first memory size and a second memory size, and the driver means may be further for saving an amount of memory based at least in part on a memory size of the smaller of the first memory size and the second memory size., when saving the context of the second operating system.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for computing, comprising:
   one or more processors; and
   a virtual machine manager to be operated by the one or more processors to instantiate, a first virtual machine with a first operating system in a background, and a second virtual machine with a second operating system in a foreground; wherein the virtual machine manager is to further on instantiation, cause the first virtual machine in background to enter a standby state;
   wherein the virtual machine manager is to further cause the second virtual machine to enter into the standby state, and move the second virtual machine, in the standby state, to background, in response to a system event, and additionally, bring the first virtual machine into the foreground, and cause the first virtual machine, in foreground, to resume out of the standby state;
   wherein to enter into the standby state, the second virtual machine is to generate a sleep event;
   wherein the apparatus further comprises a driver to cause an abbreviated restart of the apparatus, when the second virtual machine is entering into the standby state, and being moved to background;
   wherein to cause the abbreviated restart of the apparatus, the driver is to detect for the sleep event of the second virtual machine, and on detection of the sleep event of the second virtual machine, save a context of the second operating system, program a sleep state register of the apparatus with information that denotes the apparatus is to enter a sleep state, and a resume vector pointing to the driver to regain control as the apparatus enters the sleep state; and
   wherein on regaining control, the driver is to immediately resume the apparatus to switch to the first virtual machine in foreground.

2. The apparatus of claim 1, wherein while the first virtual machine in background is in the standby state, the virtual machine manager routes all interrupts to the second virtual machine in foreground to process, and none to the first virtual machine in background.

3. The apparatus of claim 1, wherein the system event comprises a docking or an undocking event.

4. The apparatus of claim 3, wherein the system event comprises an undocking event, wherein the first operating system comprises an operating system to support tablet computing, and the second operating system comprises an operating system to support laptop computing.

5. The apparatus of claim 1, wherein the virtual machine manager is further to prompt a user of the apparatus to confirm whether the user desires to switch from the second operating system to the first operating system prior to causing the second virtual machine to enter into the standby state, and moving the second virtual machine, in the standby state, to background, and additionally, bringing the first virtual machine into the foreground, and causing the first virtual machine, in foreground, to resume out of the standby state.

6. The apparatus of claim 1, wherein the first and second operating systems respectively has a first memory requirement and a second memory requirement, and the driver is further to save an amount of memory based at least in part on a smaller one of the first and second memory requirements, when saving the context of the second operating system.

7. A method for computing, comprising:
   instantiating, by a virtual machine manager of a computing device, a first virtual machine with a first operating system in a background, and a second virtual machine with a second operating system in a foreground;
   causing, by the virtual machine manager, the first virtual machine in background to enter into a standby state;
   in response to a system event, causing, by the virtual machine manager, the second virtual machine to generate a sleep event to enter into a standby state, and moving the second virtual machine, in the standby state, to background, and additionally, bringing the first virtual machine out of the standby state and resuming in foreground;
   detecting, by a driver of the computing device, the sleep event of the second virtual machine, and in response to detecting the sleep event of the second virtual machine, causing an abbreviated restart of the computing device, including saving a context of the second operating system, programming a sleep state register of the computing device with information that denotes the computing device is to enter a sleep state, and a resume vector pointing to the driver, and on regain control as the computing device enters into the sleep state, resuming immediately, by the driver, the computing device to switch to the first virtual machine in foreground.

8. The method of claim 7, further comprising while the first virtual machine in background is in the standby state, routing, by the virtual machine manager, all interrupts to the second virtual machine in foreground to process.

9. The method of claim 7, wherein the first and second operating systems respectively has a first memory requirement and a second memory requirement, and the method further comprising saving, by the driver, an amount of memory based at least in part on a smaller of the first and second memory requirements, when saving the context of the second operating system.

10. At least one non-transitory computer-readable storage medium comprising a plurality of instructions to cause an apparatus, in response to execution of the instructions by the apparatus, to:
- instantiate, with a virtual machine manager, a first virtual machine with a first operating system in a background, and a second virtual machine with a second operating system in a foreground;
- cause, with the virtual machine manager, the first virtual machine in background to enter into a standby state;
- cause, with the virtual machine manager, the second virtual machine to enter into the standby state, and move the second virtual machine, in the standby state, to background, in response to a system event, and additionally, bring the first virtual machine into the foreground, and cause the first virtual machine, in foreground, to resume out of the standby state;
- wherein to enter into the standby state, the second virtual machine is to generate a sleep event;
- wherein the apparatus is further caused to cause, with a driver, an abbreviated restart of the apparatus, when the second virtual machine is entering into the standby state, and being moved to background;
- wherein to cause the abbreviated restart of the apparatus, the driver is to detect for the sleep event of the second virtual machine, and on detection of the sleep event of the second virtual machine, save a context of the second operating system, program a sleep state register of the apparatus with information that denotes the apparatus is to enter a sleep state, and a resume vector pointing to the driver to regain control as the apparatus enters the sleep state; and
- wherein on regaining control, the driver is to immediately resume the apparatus to switch to the first virtual machine in foreground.

11. The non-transitory computer-readable storage medium of claim 10, wherein while the first virtual machine in background is in the standby state, the apparatus is further caused to route all interrupts to the second virtual machine to process.

12. The non-transitory computer-readable storage medium of claim 10, wherein the system event comprises a docking or an undocking event.

13. The non-transitory computer-readable storage medium of claim 12, wherein the system event comprises an undocking event, wherein the first operating system comprises an operating system to support tablet computing, and the second operating system comprises an operating system to support laptop computing.

14. The non-transitory computer-readable storage medium of claim 10, wherein the apparatus is further caused to prompt a user of the apparatus to confirm whether the user desires to switch from the second operating system to the first operating system prior to causing the second virtual machine to enter into the standby state, and moving the second virtual machine, in the standby state, to background, and additionally, bringing the first virtual machine into foreground, and causing the first virtual machine, in foreground, to resume out of the standby state.

15. The non-transitory computer-readable storage medium of claim 10, wherein the first and second operating systems respectively has a first memory requirement and a second memory requirement, and wherein save a context of the second operating system comprises save an amount of memory based at least in part on a smaller of the first and second memory requirements.

* * * * *